May 4, 1954  J. C. NYGARD  2,677,774
METHOD AND APPARATUS FOR STABILIZING THE
VOLTAGE OF ELECTROSTATIC GENERATORS
Filed Jan. 29, 1953  2 Sheets-Sheet 1

INVENTOR John C. Nygard
BY
Emery, Booth, Janseth, Miller and Wathen
ATTYS

May 4, 1954
J. C. NYGARD
2,677,774
METHOD AND APPARATUS FOR STABILIZING THE
VOLTAGE OF ELECTROSTATIC GENERATORS
Filed Jan. 29, 1953
2 Sheets-Sheet 2

INVENTOR   John C. Nygard
BY
Emery Bock Townsend Miller and Weidener ATTYS

Patented May 4, 1954

2,677,774

UNITED STATES PATENT OFFICE 2,677,774

METHOD AND APPARATUS FOR STABILIZING THE VOLTAGE OF ELECTROSTATIC GENERATORS

John C. Nygard, Waltham, Mass., assignor to High Voltage Engineering Corporation, Cambridge, Mass., a corporation of Massachusetts Application January 29, 1953, Serial No. 333,982

12 Claims. (Cl. 310—5)

This invention relates to a method and apparatus for stabilizing the voltage of electrostatic generators of the type wherein electric charge is transferred between a hollow electrode and ground by a traveling charge-conveying medium which passes continuously into and out of said hollow electrode. More specifically stated, this invention comprehends stabilizing the voltage of such an electrostatic generator by the transfer of electric charge from the hollow electrode thereof to the traveling charge-conveying medium at a rate which varies with generator voltage above a certain voltage in such a manner as to tend to maintain said generator voltage substantially constant.

In order that the principle of my invention may be readily understood, I have disclosed in the accompanying drawings several embodiments of apparatus whereby the method of my invention may be practised, each of which includes a simple circuit for the transfer of electric charge from the high-voltage electrode of an electrostatic belt-type generator to the down-run of the belt at a rate which varies greatly with small variations in generator voltage. Although my invention is herein illustrated with reference to an electrostatic generator whose traveling charge-conveying medium consists of an endless belt, it is clearly to be understood that my invention is not limited to belt-type generators, but that any suitable traveling charge-conveying medium may be employed, such as a rotating drum, a rotating disk, or a fluid medium. Various suitable traveling charge-conveying media are illustrated in the U. S. patent to Van de Graaff No. 1,991,236.

Figure 1:
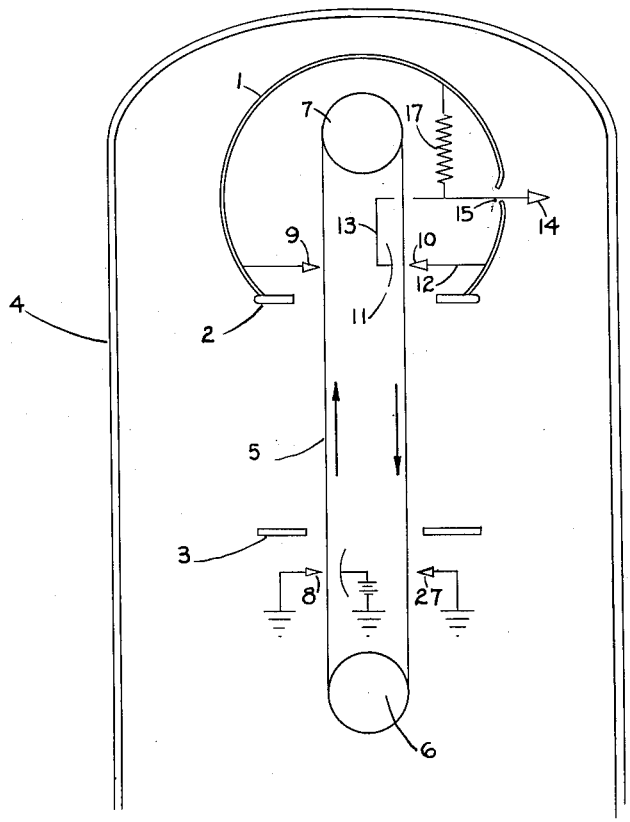
Fig. 1 is a diagram representing schematically the essential components of an electrostatic generator in conjunction with one embodiment of apparatus for practising the method of my invention.

Referring more particularly to the drawings, and first to Fig. 1 thereof, therein are shown diagrammatically such parts of an electrostatic generator as are necessary to an understanding of this invention. The said generator is of the type shown in the patent to John G. Trump, No. 2,252,668, August 12, 1941. The invention herein claimed may be applied to the said type of electrostatic apparatus, but my invention is not necessarily limited to use with such type of apparatus.

In Fig. 1 the electrostatic generator, merely diagrammatically shown, comprises the main high-potential electrode 1 consisting of a hollow shell of conducting material, such as stainless steel, this being of a generally rounded and approximately hemispherical shape and free from external projections. The electrode rests on a ring 2 of conductive material, the outer exposed surface of which is rounded, the said ring, in turn, being mounted on the top of any suitable number, such as three, of spaced elongated pillars or columns, not shown, which may be similar to those in the said patent to Trump, said pillars or columns being of insulating material of high dielectric strength.

The bases of these columns rest on the base plate 3 of conductive material which is supported by suitable brackets attached to the inner walls of a tank 4 which provides a chamber completely enclosing all the parts of the generating apparatus, but leaving a substantial clearance between its walls and the electrode and insulating columns. The said tank is desirably filled with a gas of many atmospheres' pressure which, for air, may be about 400 pounds per square inch.

The charge-carrier may be of any suitable type, but is herein shown as in the form of an endless belt 5 of such construction that the charges on its surface are longitudinally insulated from each other, the belt 5 herein being of insulating material, such as a multiple-ply rubber fabric. At its lower end the belt 5 passes over a metallic driving pulley 6 journaled in suitable brackets on the base plate. The said pulley 6 is driven by a suitable motor, not herein illustrated, to which current is supplied by conductors entering the walls of the tank 4 through a suitable bushing.

The belt 5 runs vertically upward and then downward in a parallel line, passing into and out of the hollow electrode 1 and over a metallic pulley 7 within the electrode shell, the said pulley 7 being journalled in suitable brackets supported by the ring 2 in a manner not necessary to illustrate or to refer to further.

At the lower end of the belt 5 charges of one sign are established on the moving belt 5, and at its upper end the charges carried thereby are removed and transferred to the electrode 1. The charging of the down-running side of the belt 5 with charges of the opposite sign, for the purpose of further increasing the total charge delivered to the electrode 1 is optional and is not necessary to the function of my invention.

The charge spraying corona points are indicated diagrammatically at 8 and the charge removing corona points are indicated diagrammatically at 9. It is unnecessary herein to disclose in detail the said corona points 8 and 9 or the number thereof. It is sufficient here to state that there is at 8 and 9 a set of such points extending in a straight line across the width of the said charge carrier belt 5.

Figure 2:
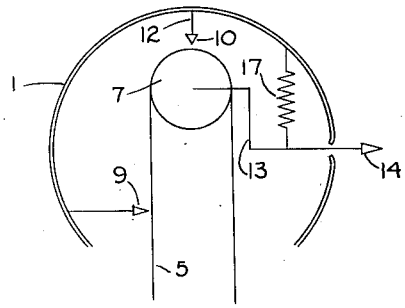
Fig. 2 is a diagram illustrating one modification of the apparatus of Fig. 1.

In accordance with my invention, I provide a pair of discharge electrodes 10, 11 within the hollow electrode 1 between which the belt 5 passes as it commences its downward journey. Said discharge electrodes 10, 11 provide a potential gradient therebetween which is relatively high in the vicinity of one of said discharge electrodes and relatively low in the vicinity of the other of said discharge electrodes. To that end, one discharge electrode, in the vicinity of which a relatively high potential gradient is to be established, may consist of a set of corona points, indicated diagrammatically at 10, which may be similar to the corona points 8 and 9. The other discharge electrode, in the vicinity of which a relatively low potential gradient is to be established, may consist of an inductor plate of conducting material, indicated diagrammatically at 11. Alternatively, the pulley 7 may itself serve as the discharge electrode providing the region of relatively low potential gradient as shown in Fig. 2. However, the capacitance between the inductor plate 11 and the hollow electrode 1 is less than the capacitance between the pulley 7 and the electrode 1. Since the response time of the voltage-stabilizing apparatus herein disclosed and claimed is improved by minimizing the capacitance between the electrode 1 and the discharge electrode which provides the relatively low potential gradient, I prefer to use the inductor plate 11.

Figure 8:
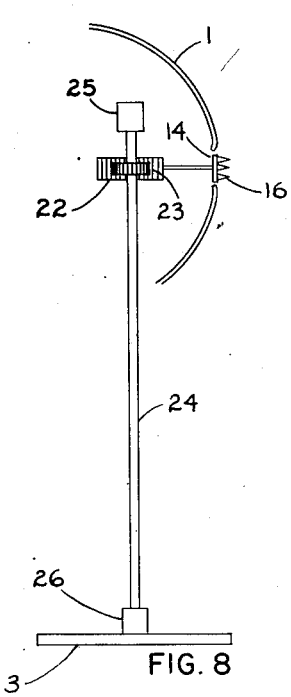
Fig. 8 is a side elevation of simple means for adjusting the voltage at which an electrostatic generator may be stabilized in accordance with my invention.

The corona points 10 are connected to the electrode 1 by a lead 12, and the inductor plate 11 is connected by a lead 13 to a corona probe 14 which is supported to extend into the electric field surrounding the electrode 1 through an aperture 15 in the electrode 1, said aperture 15 being sufficiently large so that the corona probe 14 is insulated from the electrode 1. The corona probe 14 provides a region of relatively high potential gradient to ground, and may consist of one or more corona points 16, as shown in Fig. 8.

Figure 3:
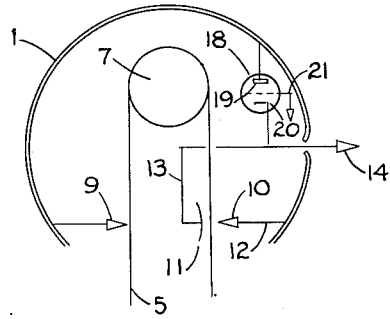
Fig. 3 is a diagram illustrating a second modification of the apparatus of Fig. 1 as applied to an electrostatic generator operating positively.
Figure 4:
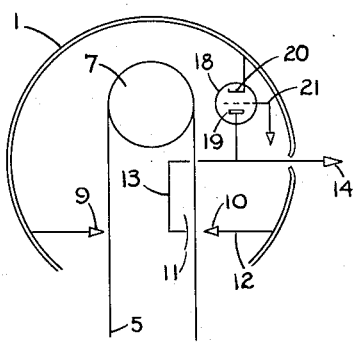
Fig. 4 is a diagram illustrating the modification of Fig. 3 as applied to an electrostatic generator operating negatively.

The corona probe 14 is connected to the electrode 1 through a high impedance path, which preferably consists of a simple resistor 17. Alternatively, a thermionic vacuum tube may provide the required high impedance path, as shown at 18 in Figs. 3 and 4. If the hollow electrode 1 is being charged positively, the plate 19 of the vacuum tube 18 is connected to the hollow electrode 1 and the cathode 20 of the vacuum tube 18 is connected to the corona probe 14, as shown in Fig. 3. If the hollow electrode is being charged negatively, these connections are reversed, as shown in Fig. 4. In either case, the impedance provided by the vacuum tube 18 may be regulated by varying the potential of its grid 21.

Figure 5:
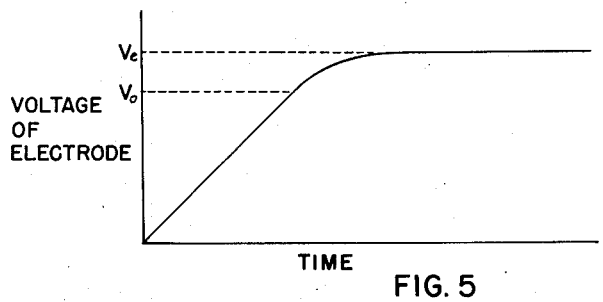
Fig. 5 is a graph illustrating the voltage of the generator of Fig. 1 as a function of time.

The voltage of the hollow electrode 1 will assume that value at which the total current thereto equals the total current therefrom. The total current thereto, in the embodiment shown in Fig. 1, is the current drawn from the belt 5 by the charge removing corona points 9. In the initial operation of the generator, the total current from the electrode 1 is negligible, and the voltage of the electrode 1 increases lineally at a rate which depends only on the current to the electrode 1 and on the capacitance between the electrode 1 and ground, as shown in the graph of Fig. 5. As the voltage of the electrode 1 increases, the voltage of the corona probe 14 also increases; and, so long as there is no corona discharge from the corona probe 14, the corona probe 14 will have the same potential as that of the electrode 1. When the voltage of the electrode 1 reaches the value $V_0$ corona discharge is initiated at the corona probe 14. Although the current in this corona discharge is very small, a substantial voltage drop is created across the high impedance resistor 17, and the same potential difference appears between the two terminals 10, 11.

Figure 6:
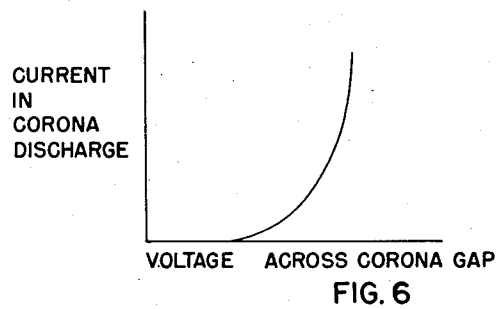
Fig. 6 is a graph illustrating the current in a corona discharge as a function of the voltage across the corona gap.
Figure 7:
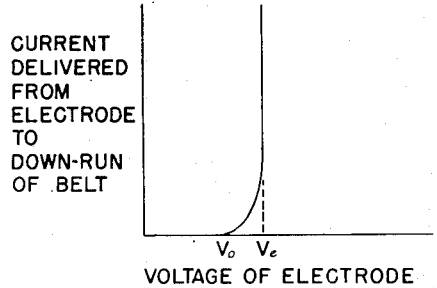
Fig. 7 is a graph illustrating the current drawn from the hollow electrode of an electrostatic generator in accordance with my invention as a function of the voltage of said electrode.

As the voltage of the electrode 1 continues to increase, the current in the corona discharge from the corona probe 14 increases exponentially, as shown in the graph of Fig. 6, so that the potential difference between the two terminals 10, 11, increases very rapidly. When the potential difference between the discharge electrodes 10, 11, is sufficient to initiate a corona discharge between these discharge electrodes 10, 11, charge is removed from the electrode 1 to the belt 5 via the corona points 10. The current in the corona discharge from the corona points 10 to the belt 5 increases exponentially with increasing potential difference between the two discharge electrodes 10, 11, as shown in Fig. 6. Since the potential difference between the two discharge electrodes 10, 11, itself increases exponentially with increasing voltage of the electrode 1, the current from the electrode 1 via the corona points 10 increases extremely rapidly as the voltage of the electrode 1 increases above the value $V_0$, as shown in Fig. 7. Consequently, as the voltage of the electrode 1 rises above the value $V_0$, the net current to the electrode 1 decreases very rapidly, and the voltage of the electrode 1 increases less and less rapidly until the net current to the electrode 1 is zero and the voltage of the electrode 1 remains constant at the equilibrium value $V_e$.

The equilibrium value $V_e$ may be adjusted by varying the position of the corona probe 14. The voltage $V_0$ at which corona discharge is initiated from the corona probe 14 depends upon the position of the corona probe 14 in the electric field surrounding the electrode 1. In general, increasing the extent to which the corona probe 14 protrudes from the electrode 1 and into the electric field surrounding the electrode 1 decreases the voltage $V_0$ at which corona discharge is initiated from the corona probe 14, and hence decreases the equilibrium value $V_e$.

The position of the corona probe 14 may be adjusted by any suitable means, and in Fig. 8 I have shown a simple mechanism for accomplishing this purpose. In said Fig. 8, the corona probe 14 is supported on a rack 22 which is engaged by a pinion 23. The pinion 23 may be rotated by means of shaft 24 of insulating material such as Lucite, supported on pillow blocks 25, 26, and extending from the hollow electrode 1 to the base plate 3. Rotation of the shaft 24 at the base plate 3 causes the pinion 23 to rotate, with resultant translational motion of the rack 22 and the corona probe 14 supported thereon.

As long as all the currents between the electrode 1 and ground remain constant, the voltage of the electrode 1 will remain at $V_e$. Furthermore, owing to the fact that a very slight deviation in the voltage of the electrode 1 from the value $V_e$ results in a very large change in the current delivered to the belt 5 by the corona points 10, the voltage of the electrode 1 is effectively stabilized at the value $V_e$.

For example, the generator may be employed in connection with an acceleration tube for the purpose of accelerating charged particles to high energy. When such acceleration tube is rendered operative, there will be a sudden drain of charge from the electrode 1, which tends to decrease its voltage below the value $V_e$. However, as soon as this voltage decreases by a very slight amount, the current drawn from the electrode 1 via the corona points 10 is reduced by a very large amount. Consequently, the net current to the electrode 1 resumes its equilibrium value of zero before the voltage of the electrode 1 can fall below $V_e$ by more than a very small amount.

It will readily be seen that the effect of the apparatus herein described and claimed is to compensate any change in the currents to and from the electrode 1 without appreciably affecting the voltage of the electrode 1. It is also apparent that, since such change is compensated by a resultant variation in the current delivered to the down-run of the belt 5, there is no time-lag resulting from the time required for the belt 5 to travel between the electrode 1 and ground. Voltage stabilizers in which such change is compensated by a resultant variation in the current delivered to the up-run of the belt 5 by the charge spraying corona points 8 are subject to the disadvantage that such compensation does not affect conditions at the electrode 1 until the belt 5 has traveled from the charge spraying corona points 8 to the charge removing corona points 9.

Although it would be possible to allow the electric charge deposited on the down-run of the belt 5 by the set of corona points 10 to remain on the belt 5 until it is removed by the collector points 9, I prefer to remove said electric charge before the belt 5 passes by the spray-on points 8. For this purpose a set of grounded collector points 27 is provided as shown in Fig. 1.

Figure 9:
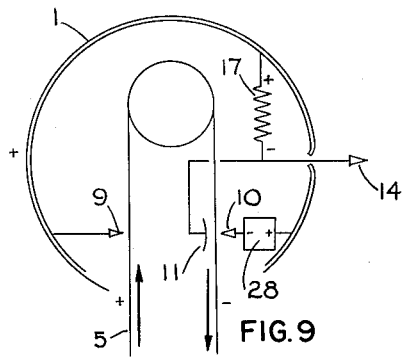
Fig. 9 is a diagram illustrating a third modification of the apparatus of Fig. 1.

My invention has been described with reference to an electrostatic belt-type generator wherein only the up-run of the belt is employed for the purpose of carrying electric charge of one sign to the hollow electrode. As hereinbefore mentioned, it is possible to use the down-run of the belt for the purpose of carrying electric charge of the opposite sign away from the hollow electrode. The use of the down-run of the belt for this purpose is optional, and may be accomplished simply by providing a power supply 28 between the set of corona points 10 and the hollow electrode 1, as shown in Fig. 9. To avoid confusion, this modification of my invention will now be described with reference to an electrostatic belt-type generator operating positively, although said modification is equally applicable to an electrostatic generator operating negatively.

Referring to Fig. 9, positive charge is collected from the up-run of the belt 5 by the collector points 9 and deposited on the electrode 1. The inductor plate 11 is at the same potential as that of the electrode 1 as long as the voltage of the electrode 1 does not exceed $V_0$, but the power supply 28 maintains the set of corona points 10 at a potential which is less positive than that of the electrode 1 by a constant amount. As long as the voltage of the electrode 1 does not exceed $V_0$, this potential difference will also appear across the two discharge electrodes 10, 11. Since the potential of the set of corona points 10 is less positive than that of the inductor plate 11, negative charge is removed from the electrode 1 and sprayed onto the down-run of the belt 5, thereby increasing the positive potential of the electrode 1.

As the positive potential of the electrode 1 rises above $V_0$, the potential difference between the inductor plate 11 and the electrode 1 increases, owing to the current flowing through the resistor 17, the potential of inductor plate 11 becoming less positive than that of the electrode 1. Since the potential of the set of corona points 10 is less positive than that of the electrode 1 by a constant amount, the result of the rise in positive potential of the electrode 1 above $V_0$ is a decrease in the potential difference between the discharge electrodes 10, 11. The potential difference between the discharge electrodes 10, 11 decreases exponentially with increasing positive potential of the electrode 1 with a resultant very rapid decrease in the negative current flowing from the electrode 1 onto the belt 5 via the set of corona points 10. Since a very rapid decrease in negative current from the electrode 1 is equivalent to a very rapid decrease in positive current to the electrode 1, it is apparent that the operation of the modified apparatus of my invention shown in Fig. 9 is essentially the same as that described in connection with Fig. 1.

Having thus described the method of my invention together with several illustrative embodiments of apparatus for practising the method, it is to be understood that although specific terms are employed, they are used in a generic and descriptive sense and not for purposes of limitation, the scope of the invention being set forth in the following claims.

I claim:

1. In an electrostatic generator including a hollow electrode and a traveling charge-conveying medium for carrying electric charge between said electrode and ground, means for stabilizing the voltage of said electrode comprising opposed discharge electrodes within said hollow electrode and between which said medium passes, said discharge electrodes consisting of a first discharge electrode and a second discharge electrode, said discharge electrodes providing a potential gradient therebetween which is relatively high in the vicinity of said first discharge electrode and relatively low in the vicinity of said second discharge electrode, said first discharge electrode being connected to said hollow electrode; a high impedance path between said second discharge electrode and said hollow electrode; and a corona discharge path between said second discharge electrode and ground.

2. In an electrostatic generator including a hollow electrode and a traveling endless belt of insulating material for carrying electric charge between said electrode and ground, means for stabilizing the voltage of said electrode comprising a pair of opposed discharge electrodes within said hollow electrode between which said belt passes, said discharge electrodes consisting of a first discharge electrode and a second discharge electrode, said discharge electrodes providing a potential gradient therebetween which is relatively high in the vicinity of said first discharge electrode and relatively low in the vicinity of said second discharge electrode, said first discharge electrode being connected to said hollow electrode; and a third discharge electrode providing a region of relatively high potential gradient to ground and extending into the electric field surrounding said hollow electrode, said third discharge electrode being connected to said second discharge electrode directly and to said hollow electrode through a high impedance path.

3. Apparatus in accordance with claim 2, wherein said high impedance path consists of a resistor.

4. Apparatus in accordance with claim 2, wherein said high impedance path consists of a thermionic vacuum tube.

5. In an electrostatic generator including a hollow electrode and a traveling endless belt of insulating material for carrying electric charge between said electrode and ground, means for stabilizing the voltage of said electrode comprising a pair of opposed discharge electrodes within said hollow electrode between which said belt passes, said discharge electrodes consisting of a first discharge electrode and a second discharge electrode, said discharge electrodes providing a potential gradient therebetween which is relatively high in the vicinity of said first discharge electrode and relatively low in the vicinity of said second discharge electrode, said first discharge electrode being connected to said hollow electrode; and a third discharge electrode providing a region of relatively high potential gradient to ground and extending into the electric field surrounding said hollow electrode, said third discharge electrode being connected to said second discharge electrode directly and to said hollow electrode through a high impedance path; and means to adjust the position of said third discharge electrode with respect to said hollow electrode.

6. In an electrostatic generator including a hollow electrode and a traveling endless belt of insulating material for carrying electric charge between said electrode and ground, means for stabilizing the voltage of said electrode comprising a pair of opposed discharge electrodes within said hollow electrode between which said belt passes, said discharge electrodes consisting of a first discharge electrode and a second discharge electrode, said discharge electrodes providing a potential gradient therebetween which is relatively high in the vicinity of said first discharge electrode and relatively low in the vicinity of said second discharge electrode; means for maintaining said first discharge electrode at a potential of the same polarity as that of said electrode but less than that of said electrode by a constant amount; and a third discharge electrode providing a region of relatively high potential gradient to ground and extending into the electric field surrounding said hollow electrode, said third discharge electrode being connected to said second discharge electrode directly and to said hollow electrode through a high impedance path.

7. In an electrostatic generator including a hollow electrode and a traveling endless belt of insulating material for carrying electric charge between said electrode and ground, means for stabilizing the voltage of said electrode comprising a first set of corona points extending into the electric field surrounding said hollow electrode and connected to said hollow electrode through a high impedance path; and a pair of opposed terminals within said hollow electrode between which said belt passes consisting of a second set of corona points and an inductor plate, said second set of corona points being connected to said hollow electrode and said inductor plate being connected to said first set of corona points.

8. In an electrostatic generator including a hollow electrode, a traveling endless belt of insulating material for carrying electric charge between said electrode and ground, and a pulley of conducting material within said hollow electrode over which said belt passes, means for stabilizing the voltage of said electrode comprising a first set of corona points extending into the electric field surrounding said hollow electrode and connected to said hollow electrode through a high impedance path; and a second set of corona points within said hollow electrode and connected to said hollow electrode, said second set of corona points being directed towards said pulley and spaced therefrom, so that said belt passes between said second set of corona points and said pulley.

9. That method of stabilizing the voltage of a high-voltage electrode of an electrostatic generator, which comprises: providing a traveling charge-conveying medium whereon charges of one sign may be deposited, longitudinally insulated from each other; conveying by such traveling medium said longitudinally isolated charges to such high-voltage electrode so that an electric field is established about said high-voltage electrode; and stabilizing the voltage of said high-voltage electrode by causing the transfer of electric charge from such high-voltage electrode to such traveling charge-conveying medium at a rate which varies with generator voltage above a certain voltage in such a manner as to tend to maintain said generator voltage substantially constant.

10. That method stabilizing the voltage of a high-voltage electrode of an electrostatic generator, which comprises: providing a traveling charge-conveying medium whereon charges of one sign may be deposited, longitudinally insulated from each other; conveying by such traveling medium said longitudinally isolated charges to such high-voltage electrode so that an electric field is established about said high-voltage electrode; and stabilizing the voltage of said high-voltage electrode by causing the transfer of electric charge of the same sign from such high-voltage electrode to such traveling charge-conveying medium at a rate which varies with generator voltage above a certain voltage in such a manner as to tend to maintain said generator voltage substantially constant.

11. That method of stabilizing the voltage of a high-voltage electrode of an electrostatic generator, which comprises: providing a traveling charge-conveying medium whereon charges of one sign may be deposited, longitudinally insulated from each other; conveying by such traveling medium said longitudinally isolated charges to such high-voltage electrode so that an electric field is established about said high-voltage electrode; discharging charges of the opposite sign from said high-voltage electrode onto said traveling charge-conveying medium for the purpose of increasing the total charge delivered to such high-voltage electrode; and stabilizing the voltage of said high-voltage electrode by causing said transfer of electric charge from such high-voltage electrode to such traveling charge-conveying medium to vary with generator voltage above a certain voltage in such a manner as to tend to maintain said generator voltage substantially constant.

12. An electrostatic apparatus or system for stabilizing the voltage of a hollow high-voltage electrode of an electrostatic generator, consisting of the following: a hollow high-voltage electrode of an electrostatic generator; a traveling charge-conveying medium whereon charges of one sign may be deposited, longitudinally insulated from each other, and which traveling charge-conveying medium enters said hollow electrode in its movement, thereby conveying such longitudinally insulated charges to such hollow high-voltage electrode, whereby an electric field is established about said hollow high-voltage electrode; and means for stabilizing the voltage of such hollow high-voltage electrode, consisting of circuiting means for effecting transfer of electric charge from said hollow high-voltage electrode onto said traveling charge-conveying medium at a rate which varies with generator voltage above a certain value in such a manner as to compensate for the generator voltage variation incident to disparity in currents to and from said hollow high voltage electrode.

No references cited.